US012795075B2

(12) United States Patent
Chen et al.

(10) Patent No.: US 12,795,075 B2
(45) **Date of Patent: *Nov. 10, 2026**

(54) METHODS AND DEVICES FOR SELECTIVELY APPLYING BI-DIRECTIONAL OPTICAL FLOW AND DECODER-SIDE MOTION VECTOR REFINEMENT FOR VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Xianglin Wang, San Diego, CA (US); Tsung-Chuan Ma, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,384

(22) Filed: Oct. 17, 2024

(65) Prior Publication Data

US 2025/0047835 A1 Feb. 6, 2025

Related U.S. Application Data

(63) Continuation of application No. 17/396,641, filed on Aug. 6, 2021, now Pat. No. 12,155,818, which is a (Continued)

(51) Int. Cl.

*H04N 19/105* (2014.01)
*H04N 19/132* (2014.01)

(Continued)

(52) U.S. Cl.

CPC ......... *H04N 19/105* (2014.11); *H04N 19/132* (2014.11); *H04N 19/159* (2014.11); *H04N 19/176* (2014.11); *H04N 19/513* (2014.11)

(58) Field of Classification Search

CPC .. H04N 19/105; H04N 19/132; H04N 19/159; H04N 19/176; H04N 19/513;

(Continued)

(56) References Cited

U.S. PATENT DOCUMENTS

2016/0057444 A1 2/2016 Gisquet et al.
2017/0347103 A1 11/2017 Yu et al.

(Continued)

FOREIGN PATENT DOCUMENTS

CN 103561263 A 2/2014
CN 109155847 A 1/2019

(Continued)

OTHER PUBLICATIONS

Chen, X., et al.; "Decoder-Side Motion Vector Refinement Based on Bilateral Template Matching;" Joint Video Exploration Team (JVET) of ITU-T SG 16 WP 3 and ISO/IEC JTC 1/SC 29/WG 11; Oct. 2016.*

(Continued)

*Primary Examiner* — Shahan Ur Rahaman

(74) *Attorney, Agent, or Firm* — Arch & Lake LLP; Hao Tan; Shen Wang

(57) ABSTRACT

Methods for video encoding, computing devices, and non-transitory computer readable storage mediums are provided. One method includes obtaining multiple blocks divided from a video picture, where each of the multiple blocks is to be encoded by an intra prediction mode or an inter prediction mode; for a current block in the multiple blocks: in response to the current block satisfying multiple pre-defined conditions, determining whether weighted prediction is enabled (Continued)

for the current block, and determining whether different weights are used when averaging list 0 predicted samples and list 1 predicted samples for the current block; determining whether to disable an application of Decoder-side Motion Vector Refinement (DMVR) on the current block based on at least one of the two determinations when DMVR is configured to be applied in a current picture that comprises the current block; and forming a bitstream based on prediction mode information of the current block.

12 Claims, 7 Drawing Sheets

Related U.S. Application Data continuation of application No. PCT/US2020/017382, filed on Feb. 8, 2020.

(60) Provisional application No. 62/803,417, filed on Feb. 8, 2019.

(51) Int. Cl.
*H04N 19/159* (2014.01)
*H04N 19/176* (2014.01)
*H04N 19/513* (2014.01)

(58) Field of Classification Search
CPC .... H04N 19/127; H04N 19/136; H04N 19/20; H04N 19/91; H04N 19/577; H04N 19/109; H04N 19/149; H04N 19/44
See application file for complete search history.

(56) References Cited

U.S. PATENT DOCUMENTS

| | | | | |
|---|---|---|---|---|
| 2018/0041769 | A1 | 2/2018 | Chuang et al. | |
| 2018/0184116 | A1 | 6/2018 | Takeuchi et al. | |
| 2018/0184117 | A1* | 6/2018 | Chen | H04N 19/52 |
| 2018/0192071 | A1 | 7/2018 | Chuang et al. | |
| 2018/0199057 | A1 | 7/2018 | Chuang et al. | |
| 2018/0262773 | A1 | 9/2018 | Chuang et al. | |
| 2018/0278949 | A1 | 9/2018 | Karczewicz et al. | |
| 2019/0020895 | A1 | 1/2019 | Liu et al. | |
| 2019/0132606 | A1 | 5/2019 | Su et al. | |
| 2020/0169748 | A1* | 5/2020 | Chen | H04N 19/563 |
| 2020/0228815 | A1* | 7/2020 | Xu | H04N 19/44 |
| 2021/0136401 | A1 | 5/2021 | Liu et al. | |

FOREIGN PATENT DOCUMENTS

| | | | |
|---|---|---|---|
| CN | 113424537 | A | 9/2021 |
| EP | 3759912 | A1 | 1/2021 |
| JP | 2018107580 | A | 7/2018 |
| JP | 2022515875 | A | 2/2022 |
| JP | 7232345 | B | 3/2023 |
| JP | 7339395 | B2 | 9/2023 |
| JP | 7546721 | B2 | 9/2024 |
| JP | 7696412 | B2 | 6/2025 |
| KR | 20180061069 | A | 6/2018 |
| TW | 201830968 | A | 8/2018 |
| WO | 2011129672 | A2 | 10/2011 |
| WO | 2018113658 | A1 | 6/2018 |
| WO | 2019001737 | A1 | 1/2019 |
| WO | 2020137643 | A1 | 7/2020 |
| WO | 2020163837 | A1 | 8/2020 |

OTHER PUBLICATIONS

The First Office Action of the counterpart JP application No. 2024-076928 dated Jul. 4, 2025, (4p).

International Search Report of PCT/US2020/017382 dated Jun. 4, 2020, (3p).

Sriram Sethuraman, Non-CE9: Co-existence analysis for DMVR with BDOF, Joint Video Experts Team (JVET) of ITU-T SG 16 WP 3 and ISO/IEC JTC 1/SC 29/WG 11, JVET-MO223-v4, 13th Meeting, Marrakech, MA, Jan. 18, 2019, (5p).

Tomonori Hashimoto et al., Non-CE4: Weighted prediction with BDOF and bi-prediction with CU weights harmonization, Joint Video Experts Team (JVET) of ITU-T SG 16 WP 3 and ISO/IEC JTC 1/SC 29/WG 11, JVET-M0067-v1, 13th Meeting, Marrakech, MA, Jan. 18, 2019, (6p).

Kyohei Unno et al., CE9-related: Relaxation of block size restriction for DMVR, Joint Video Experts Team (JVET) of ITU-T SG 16 WP 3 and ISO/IEC JTC 1/SC 29/WG 11, JVET-M0077, 13th Meeting, Marrakech, MA, Jan. 18, 2019, (4p).

Bross, Benjamin, et al., "Versatile Video Coding (Draft3)", Joint Video Experts Team (JVET) of ITU-T SG 16 WP 3 and ISO/IEC JTC 1/SC 29/WG 11, JVET-L1001-v9, 12th Meeting Macao, China, Oct. 3-12, 2018, (17p).

Chen, Yi-Wen, et al., "Non-CE9: Mutually Exclusive DMVR/BDOF at CU Level", Joint Video Experts Team (JVET) of ITU-T SG 16 WP 3 and ISO/IEC JTC 1/SC 29/WG 11, Document JVET-N0328, 14th Meeting, Geneva, CH, Mar. 19-27, 2019, (5p).

Unno, Kyohei et al., CE9: Block Size Restriction for DMVR (test 9.2.6), KDDI Corp. (KDDI Research, Inc.), Joint Video Experts Team (JVET) of ITU-T SG 16 WP3 and ISO/IEC JTC 1/SC 29/WG 11, JVET-M0076, 13th Meeting: Marrakech, MA Jan. 9-18, 2019, (3p).

First Office Action issued to Chinese Patent Application No. 202111233781.5 dated Mar. 9, 2022 with English translation, (8p).

Notification of Grant issued to Chinese Application No. 202111233781.5 dated May 30, 2022, (3p).

First Office Action issued to Chinese Application No. 202111667192.8 dated May 16, 2022, (8p).

European Search Report issued to EP Application No. 20752247.5 dated May 30, 2022, (7p).

Chen, Chun-Chi et al., "Generalized bi-prediction for inter coding", Joint Video Exploration Team (JVET) of TU-T SG 16 WP 3 and ISO/IEC JTC 1/SC 29/WG11, JVET-C0047, 3rd Meeting: Geneva, CH, May 26-Jun. 1, 2016, (4p).

Chen, Xu et al., "Decoder-Side Motion Vector Refinement Based on Bilateral Template Matching", Joint Video Exploration Team (JVET) of ITU-T SG 16 WP 3 and ISO/IEC JTC 1/SC 29/WG 11, JVET-D0029, 4th Meeting: Chengdu, China, Oct. 15-21, 2016, (4p).

Chen, Jianle et al., Algorithm description for Versatile Video Coding and Test Model 4 (VTM 4), Joint Video Experts Team (JVET) of ITU-T SG 16 WP 3 and ISO/IEC JTC 1/SC 29/WG 11, JVET-M1002-v2, 13th Meeting: Marrakech, MA, Jan. 9-18, 2019, (62p).

JVET, "CE9-related DMVR with Coarse-to-Fine Search and Block Size Limit" of ITU-T SG 16 WP 3 and ISO/IEC JTC 1?SC 29/WG 11, JVET-L382, 12th Meeting: Macao, CN, Oct. 3-12, 2018, (6p).

Second Office Action of Japanese Application No. 2021-546307 dated Aug. 2, 2022 with English translation, (9p).

Takeshi Chujoh, et al.,. Sharp Corporation, "Non-CE9: On conditions for DMVR and BDOF", Joint Video Experts Team (JVET) of ITU-T SG 16 WP 3 and ISO/IEC JTC 1/SC 29/WG 11, JVET-N0146-v1, 14th Meeting: Geneva, CH, Mar. 19-27, 2019, (5p).

Ittiam Systems Pvt. Ltd., "CE9: Results of DMVR related Tests CE9.2.1 and CE9.2.2" Joint Video Experts Team (JVET)of ITU-T SG 16 WP 3 and ISO/IEC JTC 1/SC 29/WG 11, JVET-M0147-v7, 13th Meeting: Marrakech, MA, Jan. 9-18, 2019, (6p).

Notification to Grant Right for Invention issued to CN Application No. 202310894965.9 on Jul. 8, 2024, with English Translation (3p).

Xiaoyu Xiu et al., CE9-related: Complexity reduction and bit-width control for bi-directional optical flow (BIO), Joint Video Experts Team (JVET) of ITU-T SG 16 WP 3 and ISO/IEC JTC 1/SC 29/WG 11, 12th Meeting: Macao, CN, Oct. 3-12, 2018 (15p).

Xiaoyu Xiu et al., CE9.5.3: Bi-directional optical flow (BIO) simplification, Joint Video Experts Team (JVET) of of ITU-T SG 16 WP 3 and ISO/IEC JTC 1/SC 29/WG 11, 11th Meeting: Ljubljana, SI, Jul. 10-18, 2018 (2p).

Chen, Jianle et al., "Algorithm description for Versatile Video Coding and Test Model 3 (VTM 3)" Joint Video Experts Team

(56) References Cited

OTHER PUBLICATIONS (JVET) of ITU-T SG 16 WP 3 and ISO/IEC JTC 1/SC 29/WG 11, JVET-L1002-v1, 12th Meeting: Macao, CN Oct. 3-12, 2018, (48p).
Chen, Jianle et al., "Algorithm description for Versatile Video Coding and Test Model 4 (VTM 4)" Joint Video Experts Team (JVET) of ITU-T SG 16 WP 3 and ISO/IEC JTC 1/SC 29/WG 11, JVET-M1002-v2, 13th Meeting: Marrakech, MA Jan. 9-18, 2019, (63p).

* cited by examiner

METHODS AND DEVICES FOR SELECTIVELY APPLYING BI-DIRECTIONAL OPTICAL FLOW AND DECODER-SIDE MOTION VECTOR REFINEMENT FOR VIDEO CODING

CROSS-REFERENCE TO RELATED APPLICATIONS

This application is a continuation of U.S. application Ser. No. 17/396,641, filed Aug. 6, 2021, which is a continuation of PCT Application PCT/US2020/017382 filed on Feb. 8, 2020, which is based upon and claims the benefit to U.S. provisional patent application Ser. No. 62/803,417 filed on Feb. 8, 2019, the entire disclosures of which are incorporated hercin by reference in their entireties for all purposes.

FIELD

The present disclosure relates generally to video coding and compression. More specifically, this disclosure relates to systems and methods for performing video coding using selective applications of Bi-Directional Optical Flow and Decoder-side Motion Vector Refinement on inter mode coded blocks.

BACKGROUND

This section provides background information related to the present disclosure. The information contained within this section should not necessarily be construed as prior art.

Any of various video coding techniques may be used to compress video data. Video coding can be performed according to one or more video coding standards. Some illustrative video coding standards include versatile video coding (VVC), joint exploration test model (JEM) coding, high-efficiency video coding (H.265/HEVC), advanced video coding (H.264/AVC), and moving picture experts group (MPEG) coding.

Video coding generally utilizes predictive methods (e.g., inter-prediction, intra-prediction, or the like) that take advantage of redundancy inherent in video images or sequences. One goal of video coding techniques is to compress video data into a form that uses a lower bit rate, while avoiding or minimizing degradations to video quality.

Predictive methods utilized in video coding typically include performing spatial (intra framc) prediction and/or temporal (inter frame) prediction to reduce or remove redundancy inherent in the video data, and are typically associated with block-based video coding.

In block-based video coding, the input video signal is processed block by block. For each block (also known as a coding unit (CU)), spatial prediction and/or temporal prediction may be performed.

Spatial prediction (also known as "intra prediction") uses pixels from the samples of already coded neighboring blocks (which are called reference samples) in the same video picture/slice to predict the current block. Spatial prediction reduces spatial redundancy inherent in the video signal.

During the decoding process, the video bit-stream is first entropy decoded at entropy decoding unit. The coding mode and prediction information are sent to either the spatial prediction unit (when intra coded) or the temporal prediction unit (when inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In newer video coding standards such as the now-current VVC design, new inter mode coding tools such as Bi-Directional Optical Flow (BDOF) and Decoder-side Motion Vector Refinement (DMVR) have been introduced. Such new inter mode coding tools generally help increase the efficiency of motion compensated prediction and thus improve the coding gain. However, such improvement may be accompanied by the cost of increased complexity and latency.

In order to achieve a suitable balance between the improvement and the cost associated with the new inter mode tools, the now-current VVC design has placed constraints on when to enable new inter mode coding tools such as DMVR and BDOF on an inter mode coded block.

However, the constraints present in the now-current VVC design do not necessarily achieve the best balance between the improvement and the cost. On one hand, the constraints present in the now-current VVC design permit DMVR and BDOF to be both applied on the same inter mode coded block, which increases latency because of the dependency between the operations of the two tools. On the other hand, the constraints present in the now-current VVC design can be over-permissive in certain cases regarding DMVR, resulting in unnecessary increase in complexity and latency, while under-permissive in certain cases regarding BDOF, resulting in missed opportunity of further coding gain.

SUMMARY

This section provides a general summary of the disclosure, and is not a comprehensive disclosure of its full scope or all of its features.

According to a first aspect of the present disclosure, a video coding method is performed at a computing device having one or more processors and memory storing a plurality of programs to be executed by the one or more processors. The method includes classifying a current block eligible for both applications of DMVR and BDOF based on a plurality of pre-defined conditions into one of two pre-defined classes, namely, DMVR class and BDOF class, using a pre-defined criterion based on the mode information of the current block. The method further includes using the classification of the current block in applying either DMVR or BDOF, but not both, on the current block.

According to a second aspect of the present disclosure, a video encoding method is performed at a computing device having one or more processors and memory storing a plurality of programs to be executed by the one or more processors. The method includes: obtaining a plurality of blocks divided from a video picture, where each of the plurality of blocks is to be encoded by an intra prediction mode or an inter prediction mode; for a current block in the plurality of blocks: in response to the current block satisfying a plurality of pre-defined conditions, determining whether weighted prediction is enabled for the current block, and determining whether different weights are used when averaging list 0 predicted samples and list 1 predicted samples for the current block; determining whether to disable an application of Decoder-side Motion Vector Refinement (DMVR) on the current block based on at least one of the two determinations when DMVR is configured to be applied in a current picture that comprises the current block;

and forming a bitstream based on prediction mode information of the current block. In the method, the plurality of pre-defined conditions include: the current block is not coded as affine mode; and the current block is not coded as sub-block merge mode.

According to a third aspect of the present disclosure, a video coding method is performed at a computing device having one or more processors and memory storing a plurality of programs to be executed by the one or more processors. The method includes enabling the application of BDOF on a current block when the current block is coded as sub-block merge mode.

According to a fourth aspect of the present disclosure, a computing device includes one or more processors, memory or non-transitory storage, and a plurality of programs stored in the memory. The programs, when executed by the one or more processors, cause the computing device to perform operations as described above in the first three aspects of the present disclosure.

According to a fifth aspect of the present disclosure, a non-transitory computer readable storage medium stores a plurality of programs for execution by a computing device having one or more processors. The programs, when executed by the one or more processors, cause the computing device to perform operations as described above in the first three aspects of the present disclosure.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Conceptually, many video coding standards are similar, including those previously mentioned in the Background section. For example, virtually all video coding standards use block-based processing, and share similar video coding block diagrams to achieve video compression.

Figure 1:
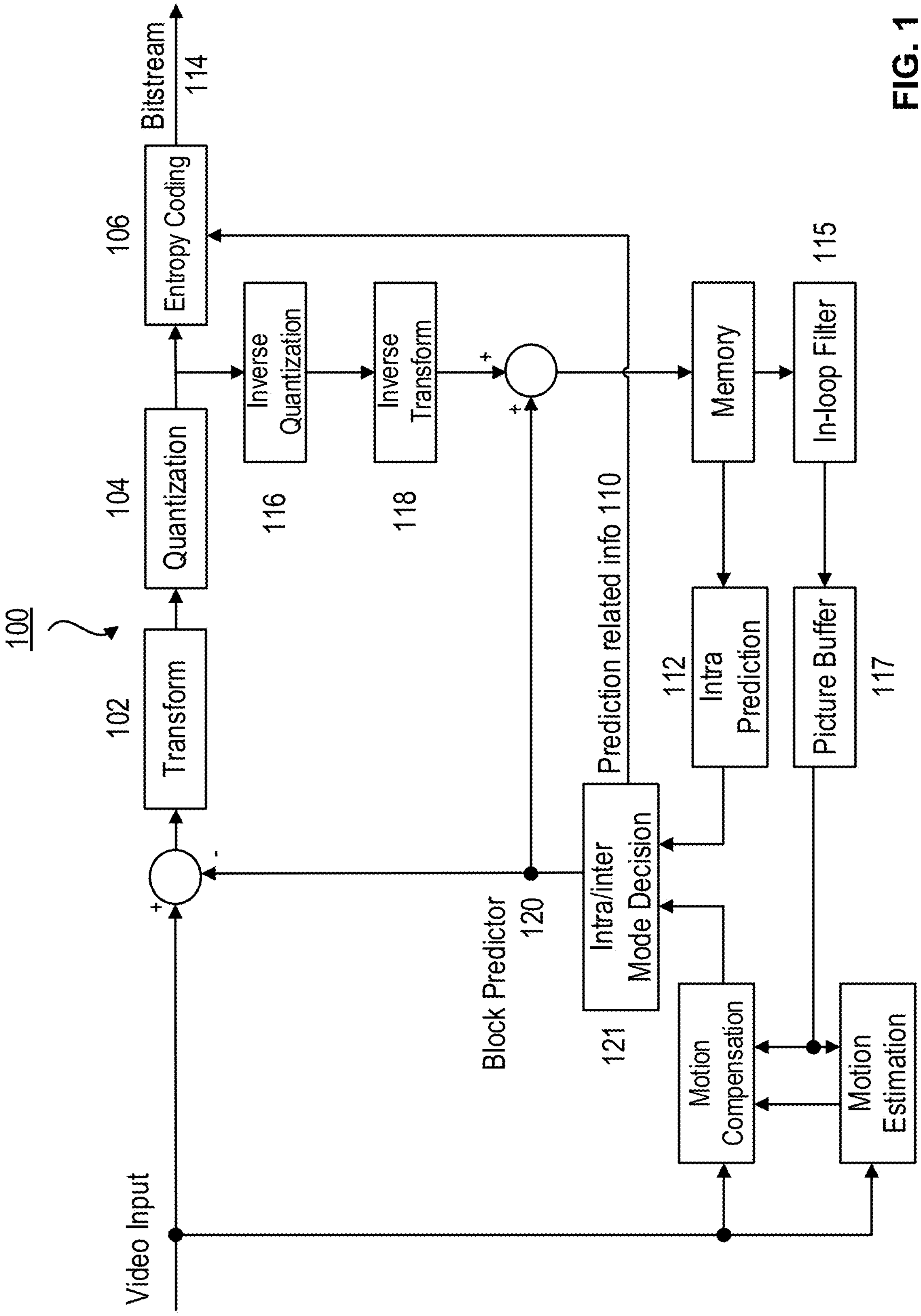
FIG. 1 is a block diagram setting forth an illustrative block-based hybrid video encoder which may be used in conjunction with many video coding standards.

FIG. 1 shows a block diagram of an illustrative block-based hybrid video encoder 100 which may be used in conjunction with many video coding standards. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Temporal prediction (also referred to as "inter prediction" or "motion compensated prediction") uses reconstructed pixels from already-coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
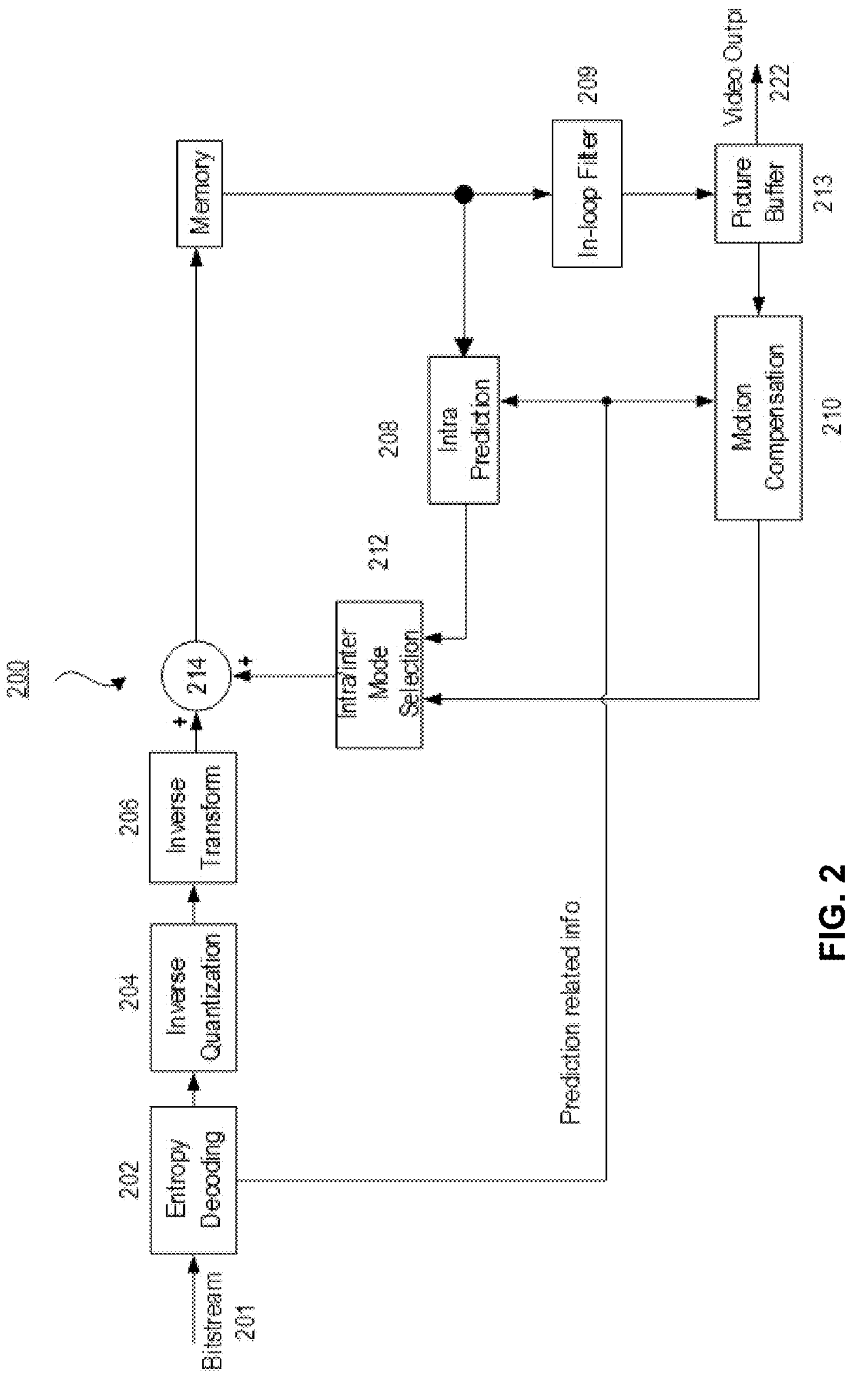
FIG. 2 is a block diagram setting forth an illustrative video decoder which may be used in conjunction with many video coding standards.

FIG. 2 is a block diagram setting forth an illustrative video decoder 200 which may be used in conjunction with many video coding standards. This decoder 200 is similar to the reconstruction-related section residing in the encoder 100 of FIG. 1. In the decoder 200 (FIG. 2), an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 can then be sent out to drive a display device, as well as used to predict future video blocks. In situations where the In-Loop Filter 209 is turned on, a filtering operation is performed on these reconstructed pixels to derive a final reconstructed Video Output 222.

In video coding standards such as HEVC, blocks may be partitioned based on quad-trees. In newer video coding standards such as the now-current VVC, more partition methods are employed, and one coding tree unit (CTU) may be split into CUs to adapt to varying local characteristics based on quad-tree, binary-tree or ternary-trec. The separation of CU, prediction unit (PU) and transform unit (TU) does not exist in most coding modes in the now-current VVC, and each CU is always used as the basic unit for both prediction and transform without further partitions. However, in some specific coding modes such as intra sub-partition coding mode, each CU may still contain multiple TUs. In the multi-type tree structure, one CTU is firstly partitioned by a quad-tree structure. Then, each quad-tree leaf node can be further partitioned by a binary and ternary tree structure.

Figure 3:
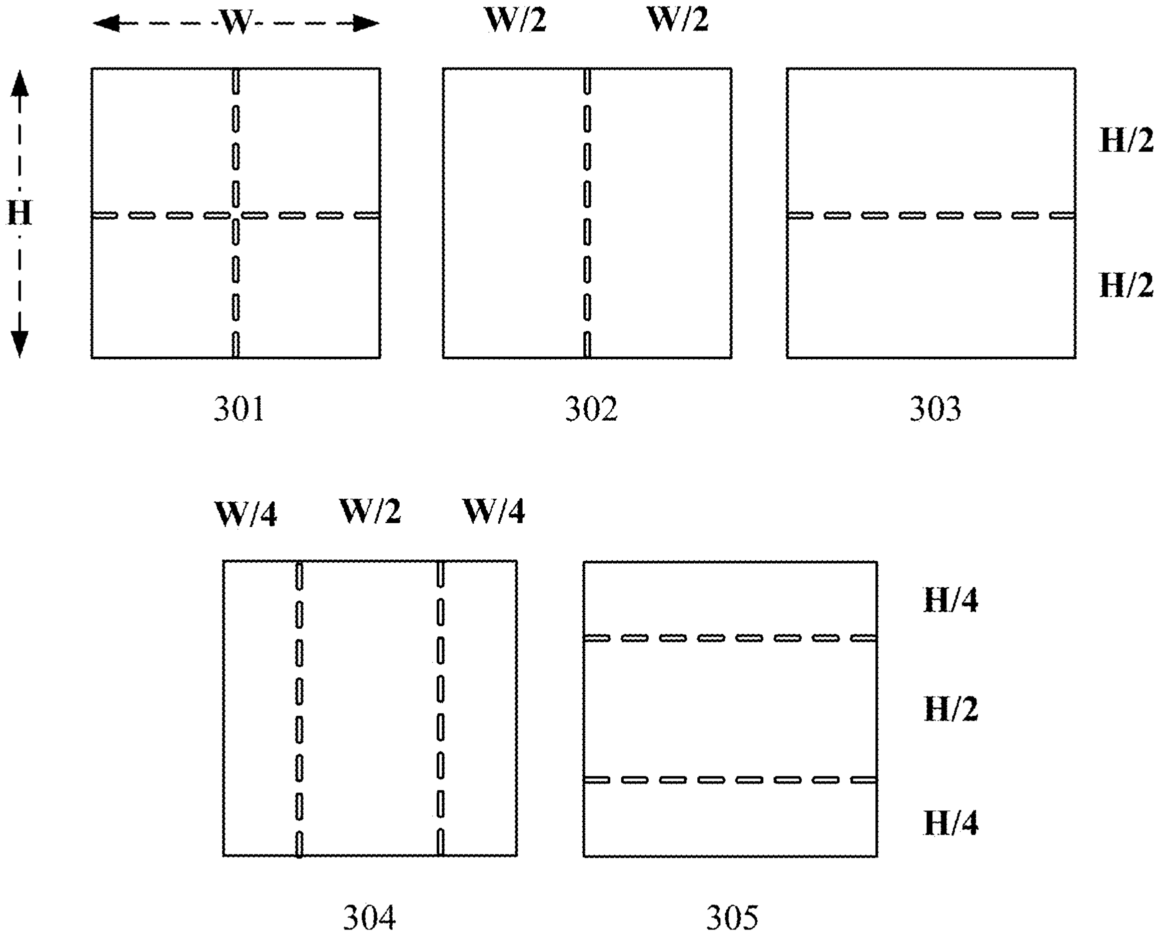
FIG. 3 is an illustration of block partitions in a multi-type tree structure which may be used in conjunction with many video coding standards.

FIG. 3 shows the five splitting types employed in the now-current VVC, namely, quaternary partitioning 301, horizontal binary partitioning 302, vertical binary partitioning 303, horizontal ternary partitioning 304, and vertical ternary partitioning 305. In situations where a multi-type tree structure is utilized, one CTU is first partitioned by a quad-tree structure. Then, each quad-tree leaf node can be further partitioned by a binary and ternary tree structure.

Using one or more of the exemplary block partitionings 301, 302, 303, 304, or 305 of FIG. 3, spatial prediction and/or temporal prediction may be performed using the configuration shown in FIG. 1. Spatial prediction (or "intra prediction") uses pixels from the samples of already-coded neighboring blocks (which are called reference samples) in the same video picture/slice to predict the current video block. Spatial prediction reduces spatial redundancy inherent in the video signal.

In newer video coding standards such as the now-current VVC, new inter-mode coding tools have been introduced, and two examples of the new inter-mode coding tools are: Bi-Directional Optical Flow (BDOF) and Decoder-side Motion Vector Refinement (DMVR).

Conventional bi-prediction in video coding is a simple combination of two temporal prediction blocks obtained from the reference pictures that are already reconstructed. However, due to the limitation of the block-based motion compensation, there could be remaining small motion that can be observed between the samples of two prediction blocks, thus reducing the efficiency of motion compensated prediction. To solve this problem, BDOF is applied in the now-current VVC design to lower the impacts of such motion for every sample inside one block.

Figure 4:
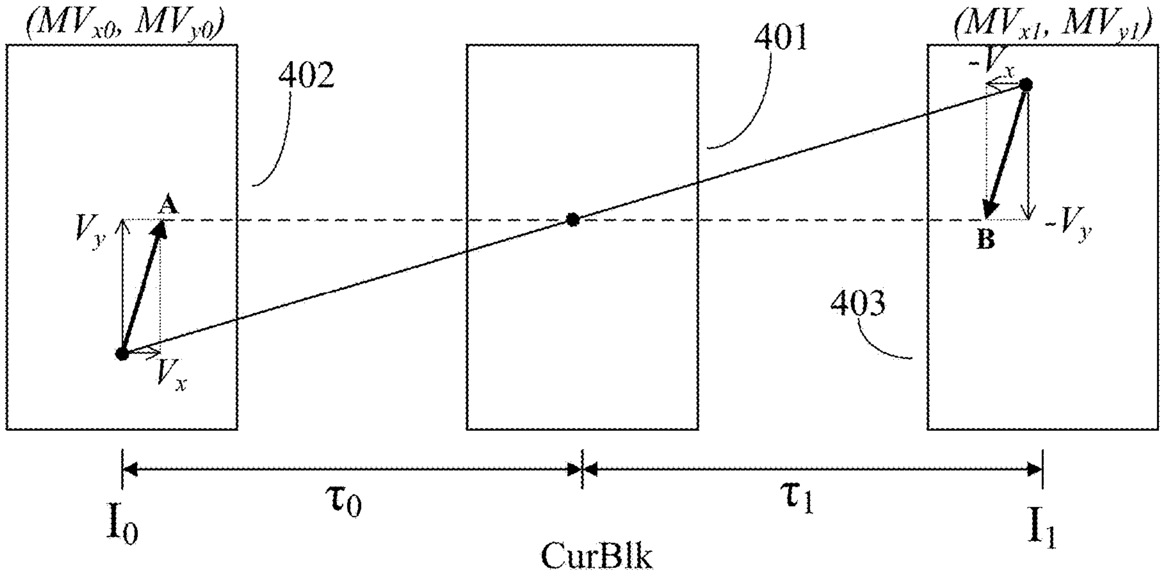
FIG. 4 is an illustration of the Bi-Directional Optical Flow (BDOF) process.

FIG. 4 is an illustration of the BDOF process. The BDOF is sample-wise motion refinement that is performed on top of the block-based motion-compensated predictions when bi-prediction is used. The motion refinement of each 4×4 sub-block 401 is calculated by minimizing the difference between reference picture list 0 (L0) and reference picture list 1 (L1) prediction samples 402 and 403 after the BDOF is applied inside one 6×6 window around the sub-block. Based on the motion refinement so derived, the final bi-prediction samples of the CU are calculated by interpolating the L0/L1 prediction samples along the motion trajectory based on the optical flow model.

DMVR is a bi-prediction technique for merge blocks with two initially signaled MVs that can be further refined by using bilateral matching prediction.

Figure 5:
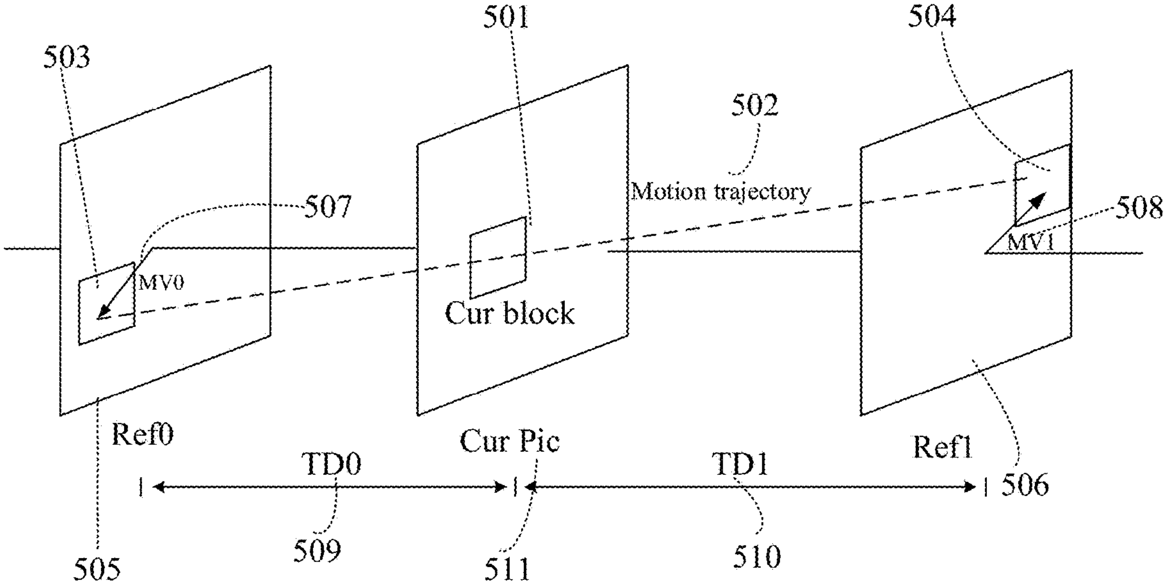
FIG. 5 is an illustration of bilateral matching used in Decoder-side Motion Vector Refinement (DMVR).

FIG. 5 is an illustration of bilateral matching used in DMVR. The bilateral matching is used to derive motion information of the current CU 501 by finding the closest match between two blocks 503 and 504 along the motion trajectory 502 of the current CU 501 in two different reference pictures 505 and 506. The cost function used in the matching process is row-subsampled sum of absolute difference (SAD). After the matching process is done, the refined MVs 507 and 508 are used for motion compensation in the prediction stage, boundary strength calculation in deblock filter, temporal motion vector prediction for subsequent pictures and cross-CTU spatial motion vector prediction for subsequent CUs. Under the assumption of continuous motion trajectory, the motion vectors MV0 507 and MV1 508 pointing to the two reference blocks 503 and 504 shall be proportional to the temporal distances, i.e., TD0 509 and TD1 510, between the current picture 511 and the two reference pictures 505 and 506. As a special case, when the current picture 511 is temporally between the two reference pictures 505 and 506 and the temporal distance from the current picture 511 to the two reference pictures 505 and 506 is the same, the bilateral matching becomes mirror based bi-directional MV.

To strike a proper balance between, on one hand, the increased coding efficiency that newer inter mode coding tools like BDOF and DMVR may bring, and on the other hand, the increased complexity and latency associated with the newer inter mode tools, the now-current VVC design has applied constraints on when BDOF or DMVR may be enabled for a current block.

In the now-current VVC design, BDOF is only enabled when all the following pre-defined BDOF conditions listed in the box immediately following this paragraph hold:

---

1. The current block uses bi-directional prediction, with one MV pointing to a reference picture which is before the current picture in displaying order and another MV pointing to a reference picture which is after the current picture in displaying order.
2. Weighted prediction is not enabled.
3. The height of current block is not equal to 4.
4. The size of current block is not equal to 4 × 8 (i.e. a width of 4 and a height of 8).
5. The current block is not coded as symmetric Motion Vector Differences (MVD) mode which is a special MVD coding mode in VVC.
6. The current block is not coded as affine mode.
7. The current block is not coded as sub-block merge mode.
8. The current block is not using different weights when averaging the predictor samples from list 0 and list1 (e.g. Bi-prediction with Weighted Averaging (BWA) with unequal weights).

---

In the now-current VVC design, DMVR is only enabled when all the following pre-defined DMVR conditions listed in the box immediately following this paragraph hold:

---

1. The current block uses bi-directional prediction, with one MV pointing to a reference picture which is before the current picture in displaying order and another MV pointing to a reference picture which is after the current picture in displaying order; moreover, the distance between the current picture and the forward reference picture and the distance between the current picture and the backward reference picture shall be the same.

-continued

2. The current block is coded as merge mode and the selected merge candidate is a regular merge candidate (e.g. the normal non-subblock spatial merge candidate or temporal merge candidate, etc.).
3. The height of current block is equal or greater than 8.
4. The area of current block is equal or greater than 64.
5. The current block is not coded as affine mode.
6. The current block is not coded as sub-block merge mode.
7. The current block is not coded as Merge mode with Motion Vector Differences (MMVD) mode.

---

The above constraints present in the now-current VVC design, while going a long way towards achieving the desired balance between coding efficiency on one hand and complexity and latency on the other hand, does not fully resolve the issue.

One remaining issue with the now-current VVC design is that, although several constraints are already applied to the enabling of BDOF and DMVR, in some cases the two decoder-side inter prediction refinement tools BDOF and DMVR can be both enabled when coding a block. In the now-current VVC design, when both the decoder-side inter prediction refinement tools are enabled, the BDOF has a dependency on final motion compensated samples of DMVR, which creates latency issues for hardware design.

A second remaining issue with the now-current VVC design is that, although several constraints are already applied to the enabling of DMVR, the constraints as a whole are still over-permissive regarding the enabling of DMVR because there are scenarios where the disabling of DMVR and the subsequent reduction in complexity and latency would strike a better balance between coding efficiency on one hand and complexity and latency on the other hand, but the now-current VVC design will enable DMVR in these scenarios.

A third remaining issue with the now-current VVC design is that, the constraints already applied to the enabling of BDOF as a whole are under-permissive regarding the enabling of BDOF because there are scenarios where the enabling of BDOF and the subsequent increase in coding gain would strike a better balance between coding efficiency on one hand and complexity and latency on the other hand, but the now-current VVC design will not enable BDOF in these scenarios.

According to a first aspect of the present disclosure, when a current block is eligible for both applications of DMVR and BDOF based on a plurality of pre-defined conditions, the current block will be classified into one of two pre-defined classes, namely, DMVR class and BDOF class, using a pre-defined criterion based on the mode information of the current block. Subsequently, the classification of the current block will be used in applying either DMVR or BDOF, but not both, on the current block. This method may be combined with current VVC on top of the pre-defined conditions above or may be implemented independently.

Figure 6:
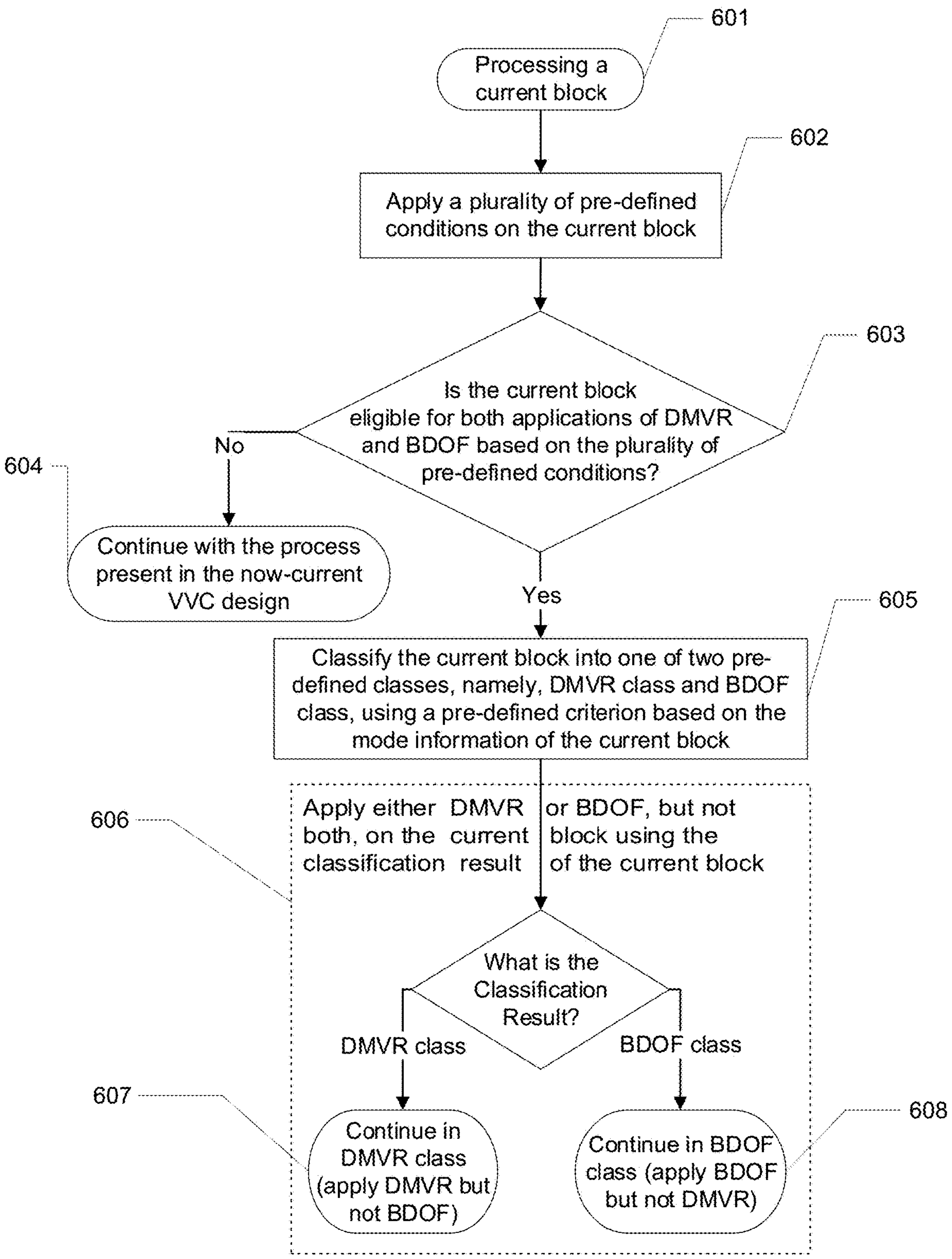
FIG. 6 is a flow chart illustrating the operation of the first aspect of the present disclosure.

FIG. 6 is a flow chart illustrating the operation of the first aspect of the present disclosure. While processing a current block (601), this operation of this aspect of the present disclosure may apply a plurality of pre-defined conditions on the current block (602), and determine whether the current block is eligible for both applications of DMVR and BDOF based on the plurality of pre-defined conditions (603). If the current block is determined to be not eligible for both applications of DMVR and BDOF based on the plurality of pre-defined conditions, this operation of this aspect of the present disclosure may continue with the process present in the now-current VVC design (604). On the other hand, if the current block is determined to be eligible for both applications of DMVR and BDOF based on the plurality of pre-defined conditions, this operation of this aspect of the present disclosure may classify the current block into one of two pre-defined classes, namely, DMVR class and BDOF class, using a pre-defined criterion based on the mode information of the current block (605). Subsequently, this operation of this aspect of the present disclosure may apply either DMVR or BDOF, but not both, on the current block using the classification result of the current block (606). The application of either DMVR or BDOF, but not both, on the current block using the classification result of the current block (606) may include continuing in DMVR class (applying DMVR but not BDOF) if the current block is classified into the DMVR class (607) and continuing in BDOF class (applying BDOF but not DMVR) if the current block is classified into the BDOF class (608).

The plurality of pre-defined conditions based on which the current block is eligible for both applications of DMVR and BDOF may, but does not need to, be the plurality of pre-defined BDOF conditions and pre-defined DMVR conditions enumerated in the boxes above.

The mode information used as basis for the pre-defined criterion includes, but is not limited to, prediction mode such as using merge mode or not, merge mode index, motion vectors, block shape, block size, predictor sample values.

According to one or more embodiments of the present disclosure, using the classification of the current block in applying either DMVR or BDOF, but not both, on the current block comprises optionally signaling a flag to indicate the classification of the current block, that is, in some examples of this embodiment, one flag is signaled to specify whether BDOF or DMVR is applied to the block, while in some other examples of this embodiment, no such flag is signaled.

According to one or more embodiments of the present disclosure, using the classification of the current block in applying either DMVR or BDOF, but not both, on the current block further comprises applying DMVR but not BDOF, either with the existing merge candidate list or with a separately generated merge candidate list, on the current block when the current block is classified into the DMVR class. That is, in some examples of this embodiment, a separate merge candidate list is generated and used exclusively when the current block is classified into the DMVR class and DMVR is applied on the current block. A syntax is signaled to indicate this DMVR merge mode and a merge index is also signaled if the DMVR merge candidate list size is greater than one. In some other examples of this embodiment, no such separate merge candidate is generated when the current block is classified into the DMVR class and DMVR is applied on the current block, and the application of DMVR on the current block uses the existing merge candidate list, and no further syntax or signaling is involved.

According to one or more embodiments of the present disclosure, using the classification of the current block in applying either DMVR or BDOF, but not both, on the current block further comprises applying BDOF but not DMVR, cither with the existing merge candidate list or with a separately generated merge candidate list, on the current block when the current block is classified into the BDOF class. That is, in some examples of this embodiment, a separate merge candidate list is generated and used exclusively when the current block is classified into the BDOF class and BDOF is applied on the current block. A syntax is signaled to indicate this BDOF merge mode and a merge index is also signaled if the BDOF merge candidate list size is greater than one. In some other examples of this embodiment, no such separate merge candidate is generated when the current block is classified into the BDOF class and BDOF is applied on the current block, and the application of BDOF on the current block uses the existing merge candidate list, and no further syntax or signaling is involved.

According to another embodiment of the first aspect of the present disclosure, classifying the current block into one of two pre-defined classes, namely, DMVR class and BDOF class, using a pre-defined criterion based on the mode information of the current block comprises classifying the current block into DMVR class when the pre-defined criterion is satisfied, and classifying the current block into BDOF class when the pre-defined criterion is not satisfied.

According to another embodiment of the first aspect of the present disclosure, classifying the current block into one of two pre-defined classes, namely, DMVR class and BDOF class, using a pre-defined criterion based on the mode information of the current block comprises classifying the current block into BDOF class when the pre-defined criterion is satisfied, and classifying the current block into DMVR class when the pre-defined criterion is not satisfied.

According to another embodiment of the first aspect of the present disclosure, the pre-defined criterion comprises whether the regular mode is chosen for the current block.

According to another embodiment of the first aspect of the present disclosure, the pre-defined criterion comprises whether the coded merge index of the current block possesses a pre-defined mathematical property.

In another example, the pre-defined mathematical property comprises the property of being equal to or greater than a pre-defined threshold number.

According to another embodiment of the first aspect of the present disclosure, the pre-defined criterion comprises whether the motion vectors of the current block satisfy a pre-defined test.

In one example, the pre-defined test comprises whether the sum of the magnitudes of all the motion vector components is greater than a pre-defined threshold number.

According to another embodiment of the first aspect of the present disclosure, the pre-defined criterion comprises whether the current block is of a pre-defined shape.

In one example, the pre-defined shape is the shape of a square.

According to another embodiment of the first aspect of the present disclosure, the pre-defined criterion comprises whether the block size of the current block possesses a pre-defined mathematical property.

In one example, the pre-defined mathematical property comprises the property of being equal to or greater than a pre-defined threshold number.

According to another embodiment of the first aspect of the present disclosure, the pre-defined criterion comprises whether the sum of absolute differences or sum of squared differences (SAD or SSD) between the list 0 predictor samples and the list 1 predictor samples of the current block possesses a pre-defined mathematical property.

In one example, the pre-defined mathematical property comprises the property of being greater than a pre-defined threshold number.

According to a second aspect of the present disclosure, when a current block is eligible for DMVR coding based on a plurality of pre-defined conditions, a first determination is made regarding whether the weighted prediction is enabled for the current block, and a second determination is made regarding whether different weights are used when averaging list 0 predictor samples and list 1 predictor samples for the current block, and whether to disable an application of DMVR on the current block may be determined based on the first and second determinations. This method may be combined with current VVC on top of the pre-defined conditions above or may be implemented independently.

Figure 7:
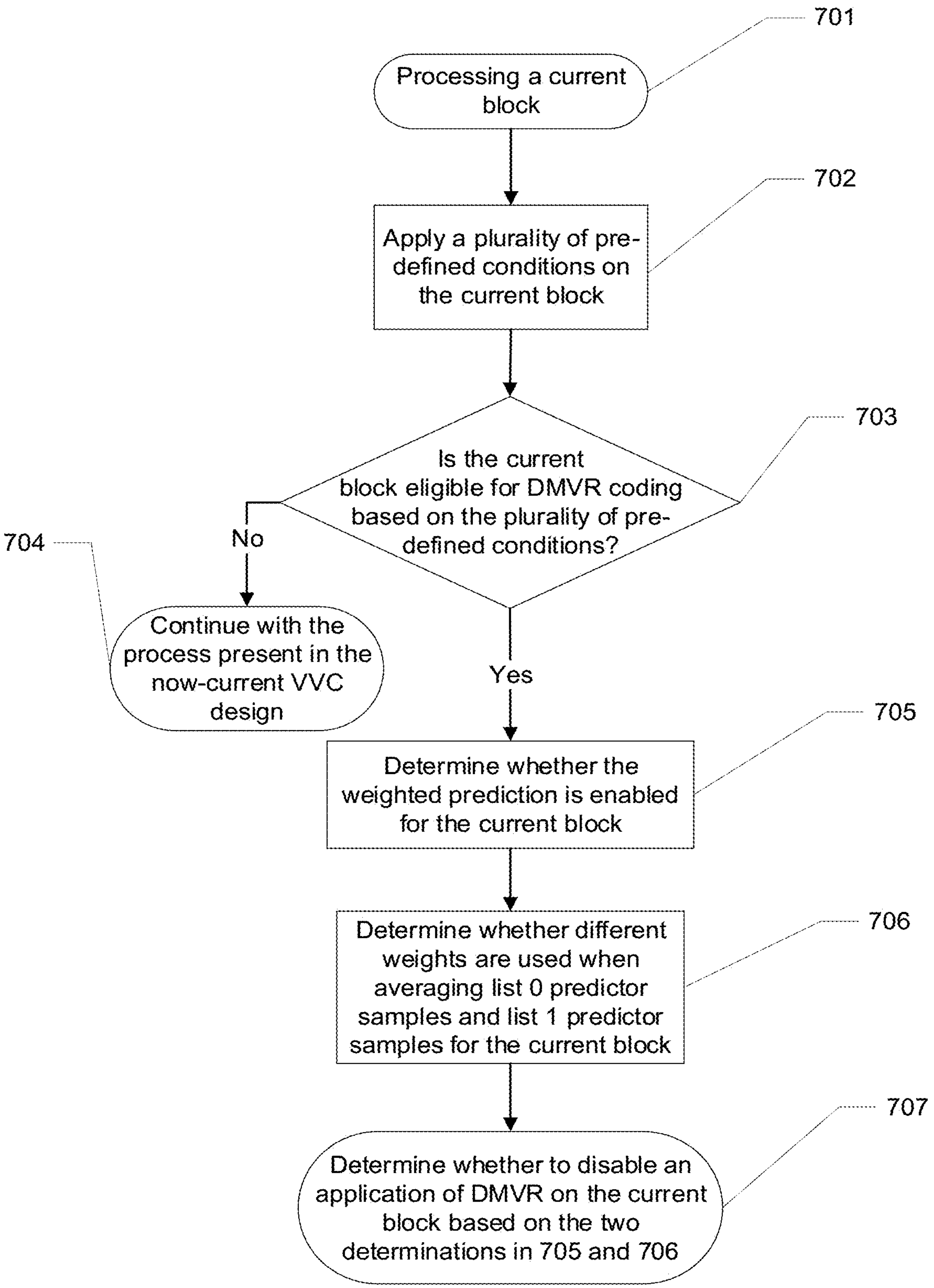
FIG. 7 is a flow chart illustrating the operation of the second aspect of the present disclosure.

FIG. 7 is a flow chart illustrating an example method of the second aspect of the present disclosure. While processing a current block (701), this operation of this aspect of the present disclosure may apply a plurality of pre-defined conditions on the current block (702), and determine whether the current block is eligible for DMVR coding based on the plurality of pre-defined conditions (703). If the current block is determined to be not eligible for DMVR coding based on the plurality of pre-defined conditions, this operation of this aspect of the present disclosure may continue with the process present in the now-current VVC design (704). On the other hand, if the current block is determined to be eligible for DMVR coding based on the plurality of pre-defined conditions, this operation of this aspect of the present disclosure may determine whether the weighted prediction is enabled for the current block (705) and also determine whether different weights are used when averaging list 0 predictor samples and list 1 predictor samples for the current block (706), and subsequently determine whether to disable an application of DMVR on the current block based on the two determinations (707).

The plurality of pre-defined conditions based on which the current block is eligible for DMVR coding may, but does not need to, be the plurality of pre-defined DMVR conditions enumerated in the box above.

According to one embodiment of the second aspect of the present disclosure, determining whether to disable the application of DMVR on the current block based on the two determinations comprises disabling the application of DMVR on the current block when the weighted prediction is determined to be enabled for the current block.

According to another embodiment of the second aspect of the present disclosure, determining whether to disable the application of DMVR on the current block based on the two determinations comprises disabling the application of DMVR on the current block when different weights are determined to be used when averaging the list 0 predictor samples and the list 1 predictor samples for the current block.

According to another embodiment of the second aspect of the present disclosure, determining whether to disable the application of DMVR on the current block based on the two determinations comprises disabling the application of DMVR on the current block when the weighted prediction is determined to be enabled for the current block and at the same time different weights are determined to be used when averaging the list 0 predictor samples and the list 1 predictor samples for the current block.

According to a third aspect of the present disclosure, the application of BDOF on a current block may be enabled when the current block is coded as sub-block merge mode. This method may be combined with current VVC on top of the pre-defined conditions above or may be implemented independently.

Figure 8:
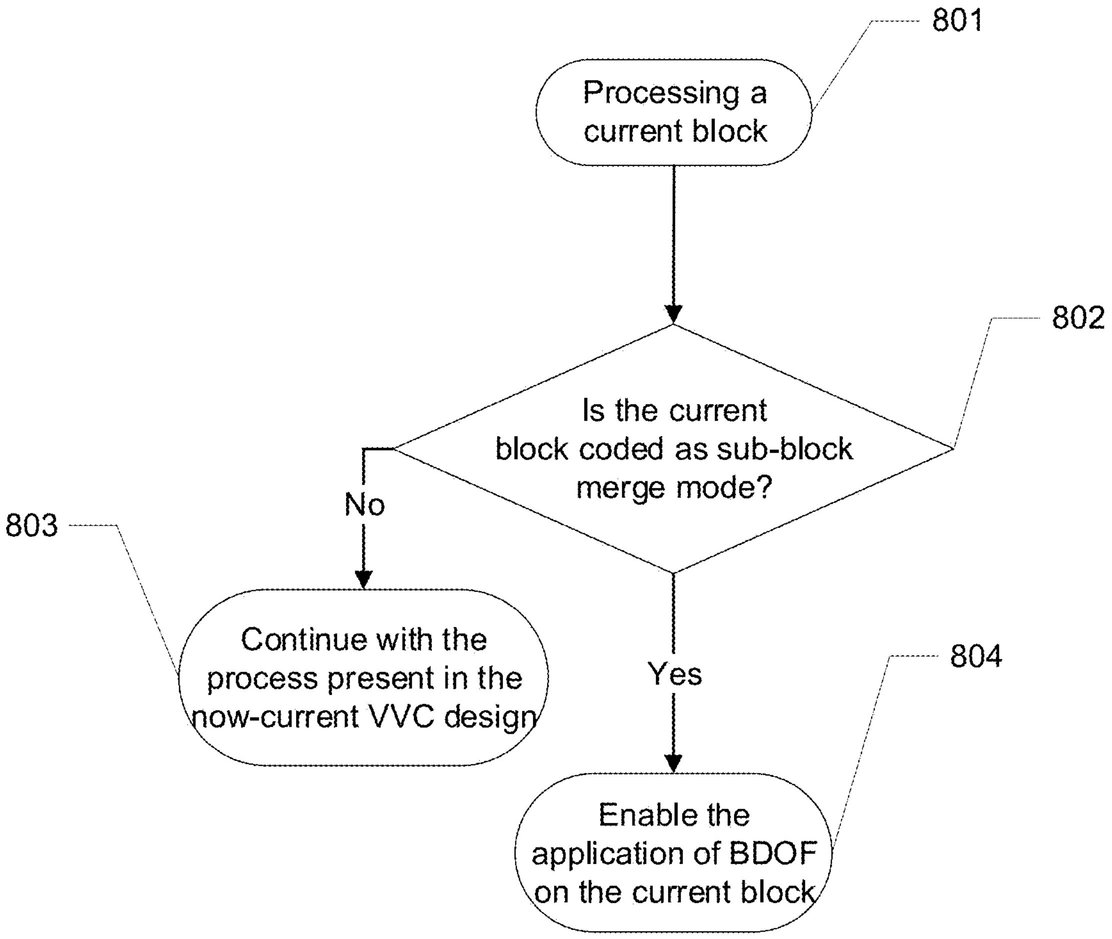
FIG. 8 is a flow chart illustrating the operation of the third aspect of the present disclosure.

FIG. 8 is a flow chart illustrating the operation of the third aspect of the present disclosure. While processing a current block (801), this operation of this aspect of the present disclosure may determine whether the current block is coded as sub-block merge mode (802). If the current block is determined to be not coded as sub-block merge mode, this operation of this aspect of the present disclosure may continue with the process present in the now-current VVC design (803). On the other hand, if the current block is determined to be coded as sub-block merge mode, this operation of this aspect of the present disclosure may enable the application of BDOF on the current block (804).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact examples described above and illustrated in the accompanying drawings, and that various modifications and changes can be made without departing from the scope thereof. It is intended that the scope of the disclosure only be limited by the appended claims.

What is claimed is:

1. A method for video coding, comprising:

obtaining a plurality of blocks divided from a video picture, wherein each of the plurality of blocks is in an intra prediction mode or an inter prediction mode;

for a current block in the plurality of blocks:

determining the current block is not coded as affine mode;

determining the current block is not coded as sub-block merge mode;

determining the current block uses bi-directional prediction, with one motion vector (MV) pointing to a forward reference picture before a current picture in displaying order and another MV pointing to a backward reference picture after the current picture in displaying order, wherein a distance between the current picture and the forward reference picture and a distance between the current picture and the backward reference picture are same;

determining the current block is coded as merge mode and a selected merge candidate is a regular merge candidate;

determining a height of the current block is equal to or greater than 8;

determining an area of the current block is equal to or greater than 64;

determining the current block is not coded as Merge mode with Motion Vector Differences (MMVD) mode;

determining whether weighted prediction is enabled for the current block;

determining whether different weights are used when averaging list 0 predicted samples and list 1 predicted samples for the current block; and determining whether to disable an application of Decoder-side Motion Vector Refinement (DMVR) on the current block based on the determinations of all the above determining steps.

2. The method of claim 1, wherein determining whether to disable the application of DMVR on the current block based on the determinations comprises:

disabling the application of DMVR on the current block when the weighted prediction is determined to be enabled for the current block.

3. The method of claim 1, wherein determining whether to disable the application of DMVR on the current block based on the determinations comprises:

disabling the application of DMVR on the current block when different weights are determined to be used when averaging the list 0 predicted samples and the list 1 predicted samples for the current block.

4. The method of claim 1, wherein determining whether to disable the application of DMVR on the current block based on the determinations comprises:

disabling the application of DMVR on the current block when the weighted prediction is determined to be enabled for the current block and at the same time different weights are determined to be used when averaging the list 0 predicted samples and the list 1 predicted samples for the current block.

5. A computing device comprising:

one or more processors;

a non-transitory storage coupled to the one or more processors; and a plurality of programs stored in the non-transitory storage that, when executed by the one or more processors, cause the computing device to perform acts comprising:

obtaining a plurality of blocks divided from a video picture, wherein each of the plurality of blocks is in an intra prediction mode or an inter prediction mode;

for a current block in the plurality of blocks:

determining the current block is not coded as affine mode;

determining the current block is not coded as sub-block merge mode;

determining the current block uses bi-directional prediction, with one motion vector (MV) pointing to a forward reference picture before a current picture in displaying order and another MV pointing to a backward reference picture after the current picture in displaying order, wherein a distance between the current picture and the forward reference picture and a distance between the current picture and the backward reference picture are same;

determining the current block is coded as merge mode and a selected merge candidate is a regular merge candidate;

determining a height of the current block is equal to or greater than 8;

determining an area of the current block is equal to or greater than 64;

determining the current block is not coded as Merge mode with Motion Vector Differences (MMVD) mode;

determining whether weighted prediction is enabled for the current block;

determining whether different weights are used when averaging list 0 predicted samples and list 1 predicted samples for the current block; and determining whether to disable an application of Decoder-side Motion Vector Refinement (DMVR) on the current block based on the determinations of all the above determining steps.

6. The computing device of claim 5, wherein determining whether to disable the application of DMVR on the current block based on the determinations comprises:

disabling the application of DMVR on the current block when the weighted prediction is determined to be enabled for the current block.

7. The computing device of claim 5, wherein determining whether to disable the application of DMVR on the current block based on the determinations comprises:

disabling the application of DMVR on the current block when different weights are determined to be used when averaging the list 0 predicted samples and the list 1 predicted samples for the current block.

8. The computing device of claim 5, wherein determining whether to disable the application of DMVR on the current block based on the determinations comprises:

disabling the application of DMVR on the current block when the weighted prediction is determined to be enabled for the current block and at the same time different weights are determined to be used when averaging the list 0 predicted samples and the list 1 predicted samples for the current block.

9. A method for storing a bitstream, comprising:

generating a bitstream by performing an coding method; and storing the bitstream, wherein the coding method comprises:

obtaining a plurality of blocks divided from a video picture, wherein each of the plurality of blocks is in an intra prediction mode or an inter prediction mode;

for a current block in the plurality of blocks:

determining the current block is not coded as affine mode;

determining the current block is not coded as sub-block merge mode;

determining the current block uses bi-directional prediction, with one motion vector (MV) pointing to a forward reference picture before a current picture in displaying order and another MV pointing to a backward reference picture after the current picture in displaying order, wherein a distance between the current picture and the forward reference picture and a distance between the current picture and the backward reference picture are same;

determining the current block is coded as merge mode and a selected merge candidate is a regular merge candidate;

determining a height of the current block is equal to or greater than 8;

determining an area of the current block is equal to or greater than 64;

determining the current block is not coded as Merge mode with Motion Vector Differences (MMVD) mode;

determining whether weighted prediction is enabled for the current block;

determining whether different weights are used when averaging list 0 predicted samples and list 1 predicted samples for the current block; and determining whether to disable an application of Decoder-side Motion Vector Refinement (DMVR) on the current block based on the determinations of all the above determining steps.

10. The method of claim 9, wherein determining whether to disable the application of DMVR on the current block based on the determinations comprises:

disabling the application of DMVR on the current block when the weighted prediction is determined to be enabled for the current block.

11. The method of claim 9, wherein determining whether to disable the application of DMVR on the current block based on the determinations comprises:

disabling the application of DMVR on the current block when different weights are determined to be used when averaging the list 0 predicted samples and the list 1 predicted samples for the current block.

12. The method of claim 9, wherein determining whether to disable the application of DMVR on the current block based on the determinations comprises:

disabling the application of DMVR on the current block when the weighted prediction is determined to be enabled for the current block and at the same time different weights are determined to be used when averaging the list 0 predicted samples and the list 1 predicted samples for the current block.

* * * * *